Figure 1:
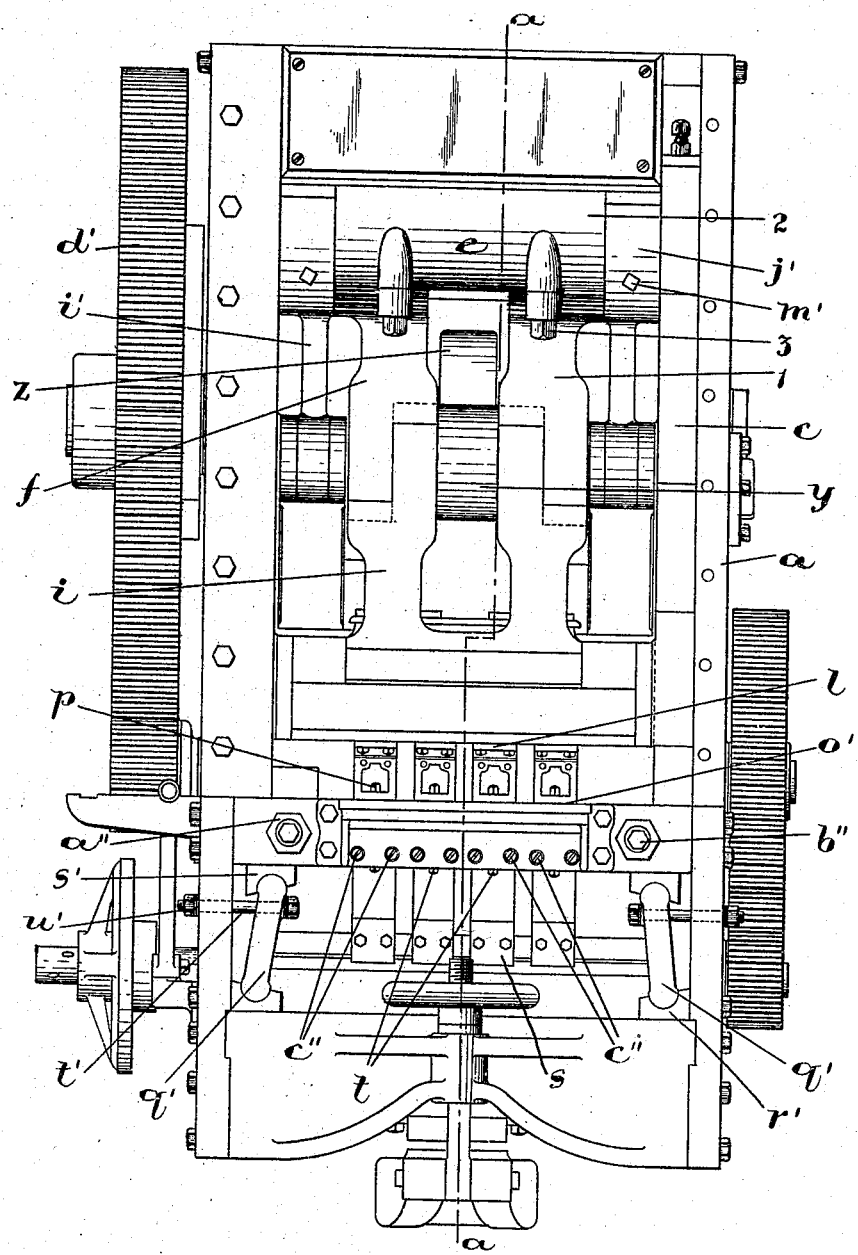

A. & J. BERG.
BRICK PRESS.
APPLICATION FILED MAY 18, 1908.

932,674.

Patented Aug. 31, 1909.
8 SHEETS—SHEET 1.

Witnesses.
H. C. Trimble.
N. R. Robertson.

Inventors.
Anton Berg
John Berg
by C. N. Rucker
Attorney

A. & J. BERG.
BRICK PRESS.
APPLICATION FILED MAY 18, 1908.

932,674.

Patented Aug. 31, 1909.
8 SHEETS—SHEET 3.

Witnesses.

Inventors.

A. & J. BERG.
BRICK PRESS.
APPLICATION FILED MAY 18, 1908.

932,674.

Patented Aug. 31, 1909.
8 SHEETS—SHEET 4.

Witnesses:

Inventors.

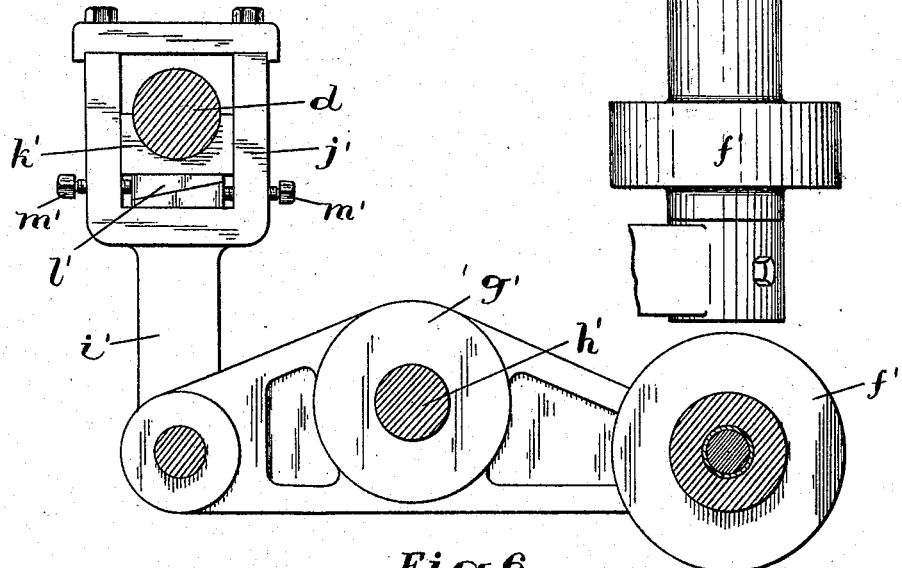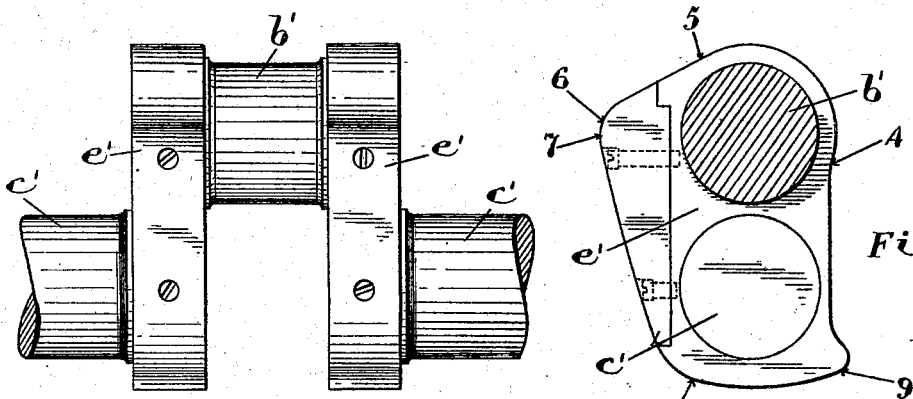

A. & J. BERG.
BRICK PRESS.
APPLICATION FILED MAY 18, 1908.

932,674.

Patented Aug. 31, 1909.
8 SHEETS—SHEET 6.

Witnesses.
H. L. Trimble.
N. R. Robertson.

Inventors.
Anton Berg
John Berg
by C. H. Riches
attorney

A. & J. BERG.
BRICK PRESS.
APPLICATION FILED MAY 18, 1908.

932,674.

Patented Aug. 31, 1909.
8 SHEETS—SHEET 8.

Witnesses.
H. L. Trimble
N. R. Robertson

Inventors.
Anton Berg
John Berg
by C. A. Richs
Attorney

UNITED STATES PATENT OFFICE.

ANTON BERG AND JOHN BERG, OF TORONTO, ONTARIO, CANADA.

BRICK-PRESS.

932,674.     Specification of Letters Patent.     Patented Aug. 31, 1909.

Application filed May 18, 1908. Serial No. 433,511.

*To all whom it may concern:*

Be it known that we, ANTON BERG and JOHN BERG, both of the city of Toronto, in the county of York and Province of Ontario, Canada, have invented certain new and useful Improvements in Brick-Presses; and we hereby declare that the following is a full, clear, and exact description of the same.

This invention relates to a press having a cycle of sequential movements which may be generally described as consisting of the filling of the molds, the compression of the material therein, and the delivery of the material from the molds by the compression means when the compression movements are completed, and it relates particularly to the principle of the construction of the parts effecting these movements, and to the means by which the parts can be adjusted to compensate for the wear upon them and for any selected variation in the thickness of the molded material.

The cycle of sequential movements originates with the revolution of the main shaft of the press during which the lifting cam or cams revolve and actuate the lifting levers and lifting arms to successively lower the upper toggle shaft, side bars, and lower cross head to position the lower plungers at the bottom of the molds, and hold the lower plungers rigidly in that position while the upper plungers apply the initial or first top pressure, and then partly raise the upper toggle shaft and side bars, and lower cross head, and cause the lower plungers to apply the second, or lower pressure and then hold the lower plungers and lower cross head rigidly in that position while the upper plungers repeat the top pressure, and then raise the upper toggle shaft side bars, and lower cross head, to lift the lower plungers to the level of the top surface of the mold table.

To regulate the position of the lower plungers with respect to the top surface of the mold table at the period of the delivery of the molded material from the molds the accurate adjustment of the side bars must be provided for, and this adjustment can be effected by providing the lifting arms with elongated boxes, mounted on the upper toggle shaft, and placing in each box a semi-bushing adjustable, longitudinally with respect to the length of the lifting arm, by inclined wedges interposed between the semi-bushing and the bottom of the box, and under certain conditions it may be necessary to provide for the vertical adjustment of the mold table with respect to the top surface of the lower plungers during the delivery of the molded material. This adjustment can be effected by the employment of adjusting arms articulatingly connected to the main frame and articulatingly and slidably connected to the mold table and moving the adjusting arms by adjusting bolts into an upright or into an inclined position.

The wear of the plungers or plunger plates, and any alteration in the thickness of the molded material can be compensated for by adjusting the toggle to regulate the distance between the upper and lower plungers, and the means by which this adjustment is attained consists in forming either the upper or lower toggle bar or each of them of two separable parts bolted together so that the parts may be disconnected to permit of the introduction of a shim between them or for the removal of the shim therefrom to respectively increase or decrease the length of the toggle.

The toggle is operated by a connecting link connected with the toggle knuckle and with the crank of the main shaft so as to require no intermediate support between its places of connection when the toggle is moving between the places of its greatest and least flexion or when stationary.

It is necessary under certain conditions to laterally adjust the upper and lower plungers on the upper and lower cross heads and it is also necessary to provide for the easy removal and replacement of these parts when altering the machine to vary the size, shape, or quantity of the manufactured product produced during each cycle of movement, and this adjustment of the plungers is effected by connecting the upper plungers to the upper cross head by a removable clamping means which when loosened, will permit the upper plungers being shifted laterally on the upper cross head, and when tightened will securely hold the upper plungers in place, and a clamping means which will connect the lower plungers to the lower cross head to permit of the lower plungers being laterally adjusted to correspond with the lateral adjustment of the upper plungers and which will securely hold the lower plungers in place when tightened.

To compensate for the wear upon the mold parts and to provide for the adjustment of the mold sides without varying the dimensions of the molds, the mold table is provided with eccentrically formed bolts to engage the adjusting blocks at the outer surfaces of the side walls of the end molds, the eccentric bolts having means by which they can be adjusted and other means by which they can be locked in their adjusted position to clamp the mold parts together, the end walls being adjusted by adjusting screws passing through the mold table and acting directly on the end walls.

For an understanding of the invention reference is to be had to the following description and to the accompanying drawings in which:—

Figure 2:
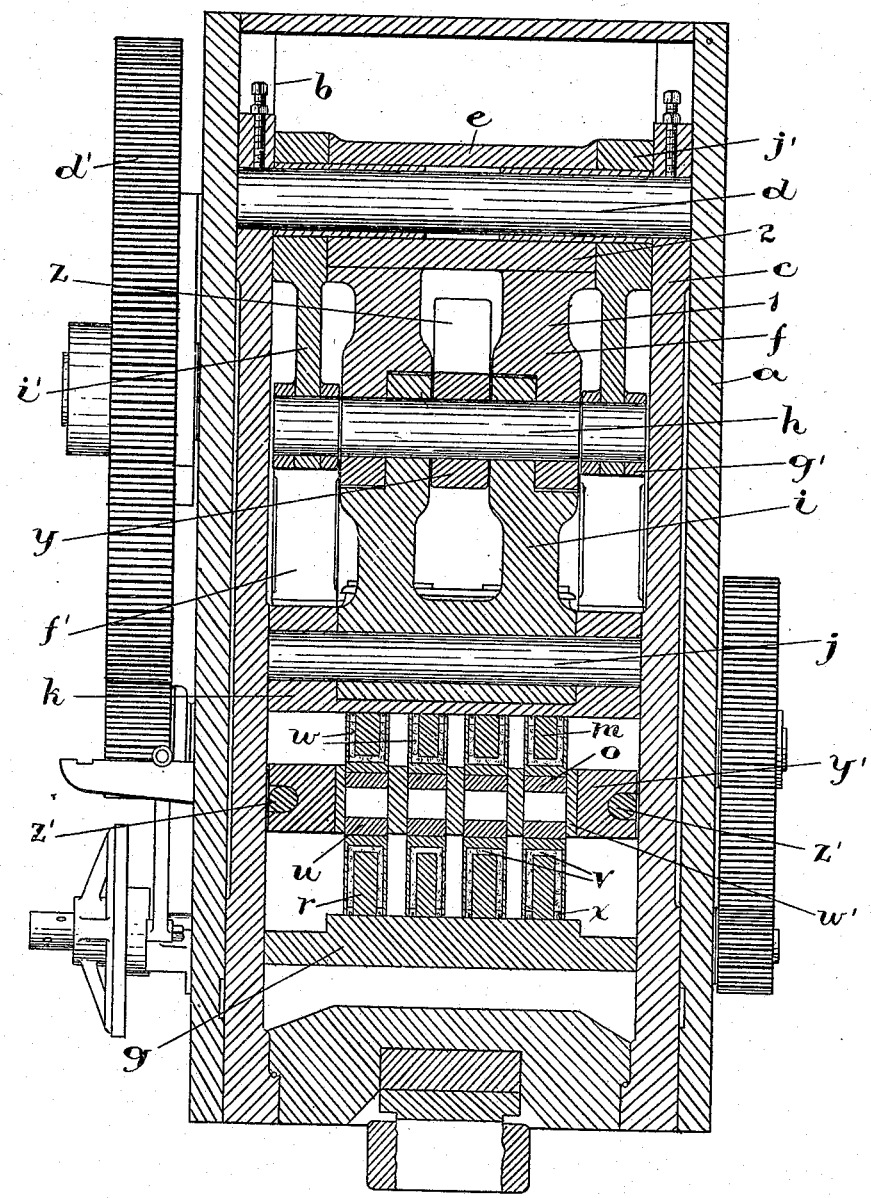
Figure 3:
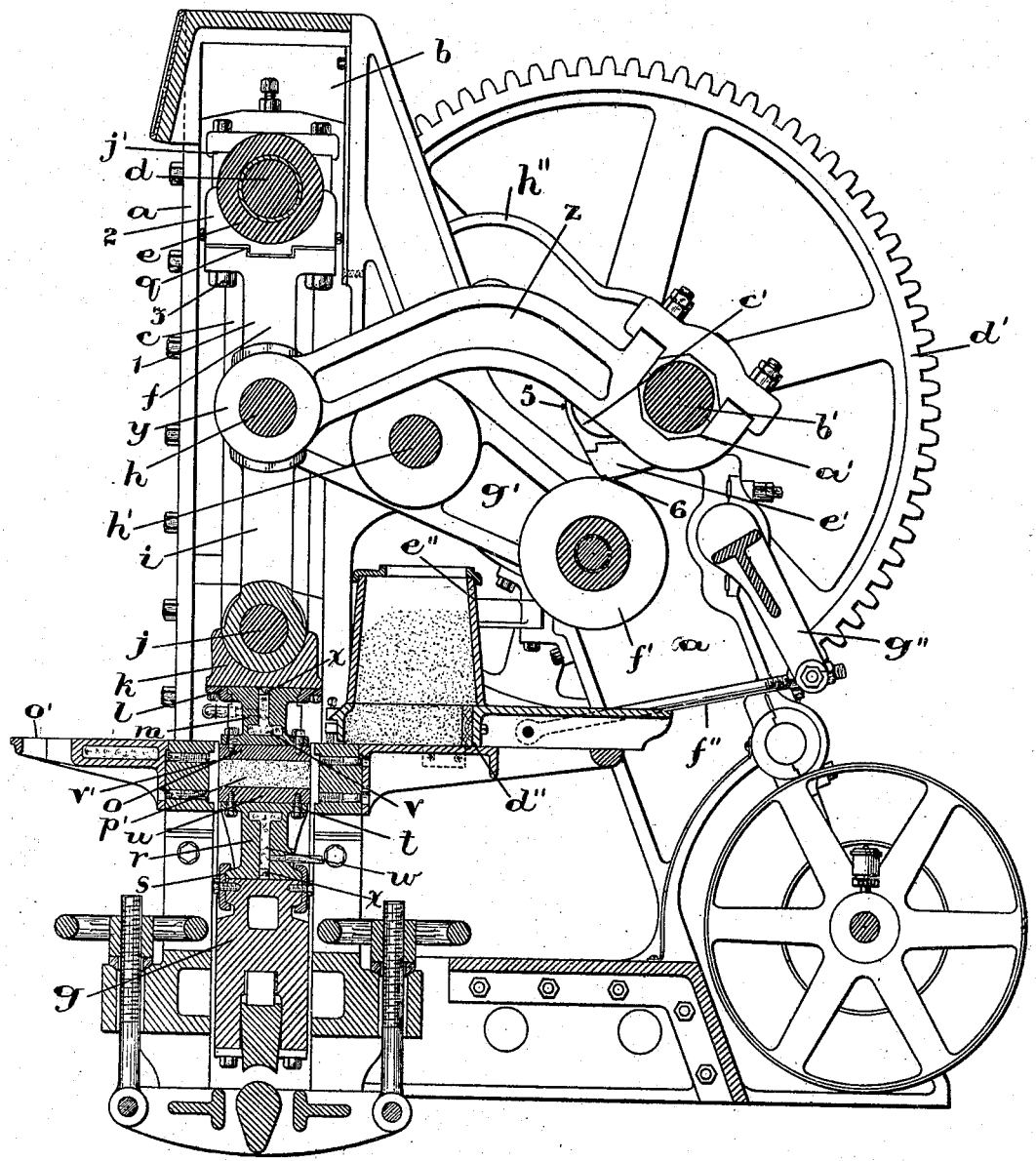
Figure 15:
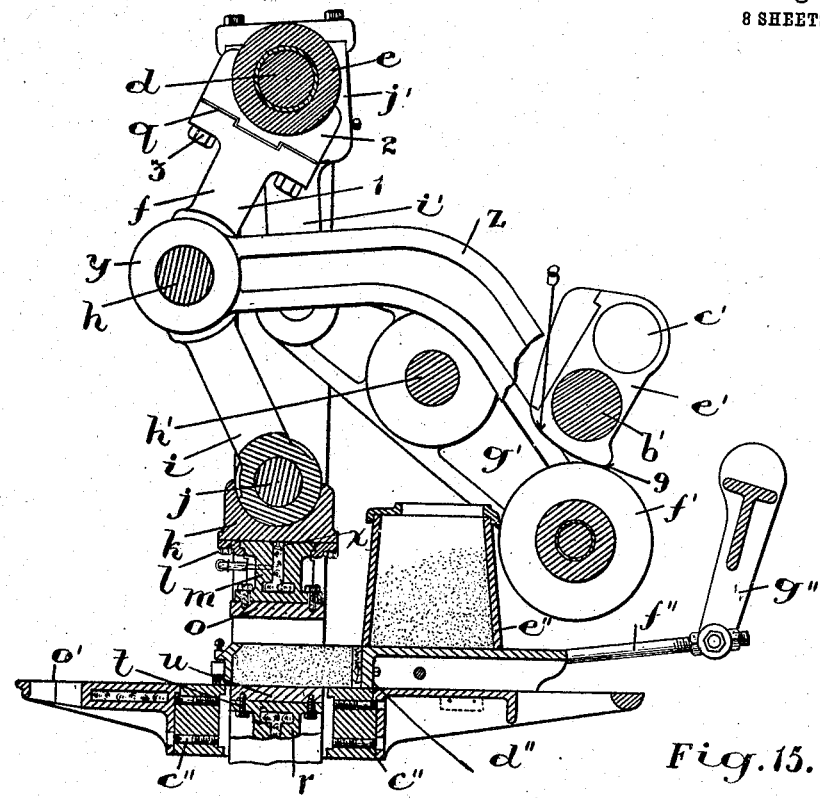
Figure 4:
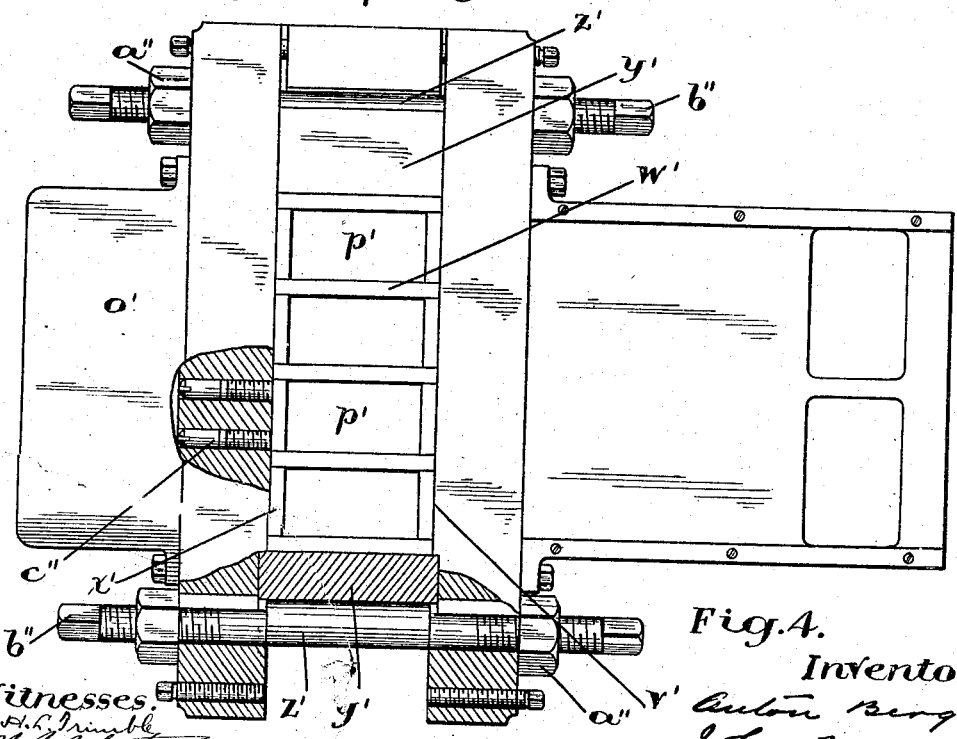
Figure 14:
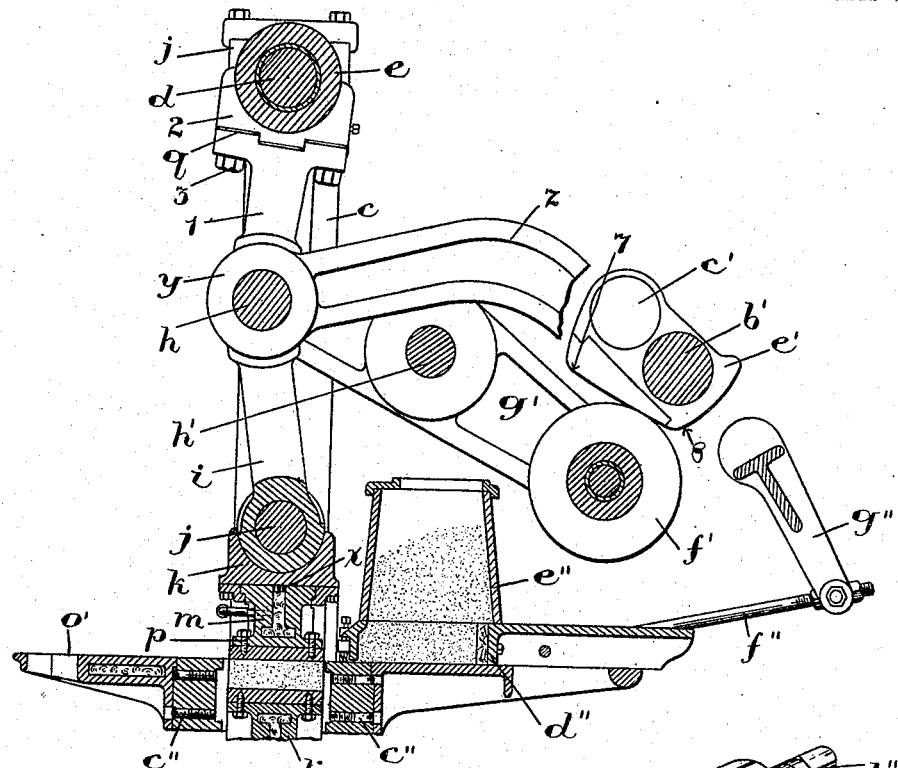
Figure 9:
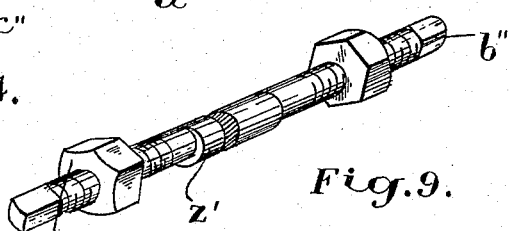
Figure 10:
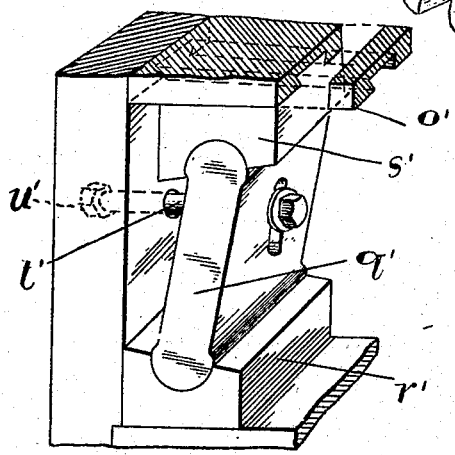
Figure 16:
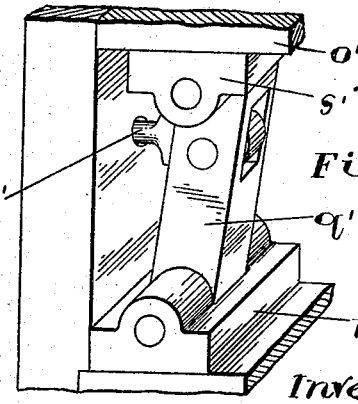
Figure 11:
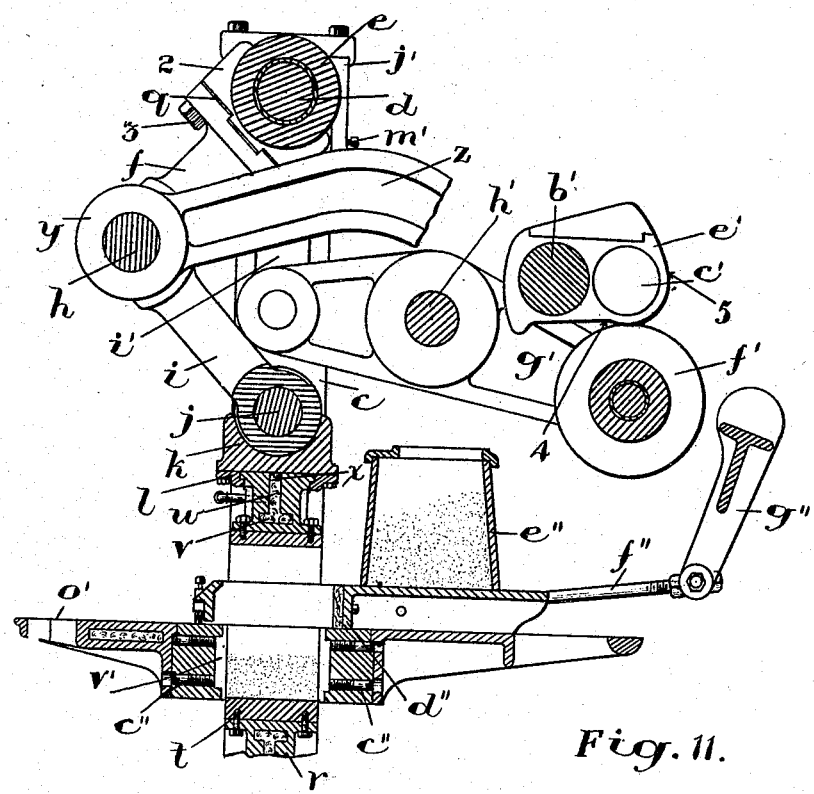
Figure 13:
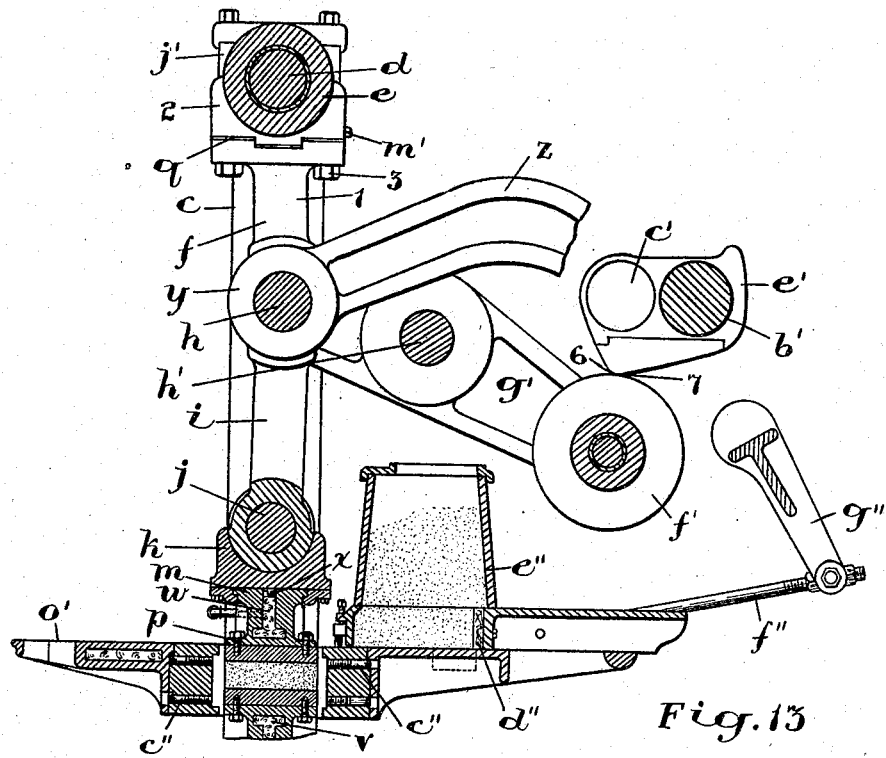
Figure 12:
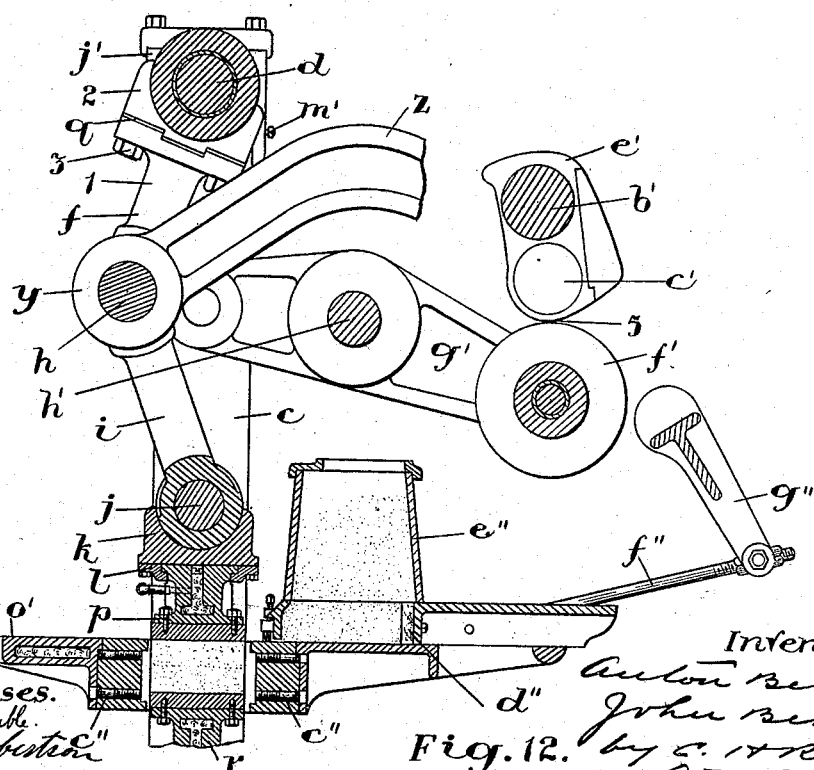

Figure 1, is a vertical elevation of the front of the press. Fig. 2, is a vertical section looking at the press from the same position as Fig. 1. Fig. 3, is a transverse section taken on the line $a$—$a$ Fig. 1. Fig. 4, is a plan view of the mold table and molds. Fig. 5, is a plan view of one of the lifting levers and lifting arms. Fig. 6, is a side elevation of the lifting lever and lifting arm shown in Fig. 5. Fig. 7, is a plan view of the main shaft crank, and part of the main shaft. Fig. 8, is a side elevation of one of the cams for operating the lifting levers. Fig. 9, is a perspective view of one of the eccentric adjusting bolts for the mold side walls. Fig. 10, is a perspective view of one of the adjusting arms for the mold table, the adjusting bolt, and a portion of the main frame, mold table and one of the sliding cup-shaped blocks. Fig. 11, is a sectional view showing the position of the upper and lower plungers when the molds are being filled. Fig. 12, is a sectional view showing the position of the parts illustrated in Fig. 11, when the upper plungers apply the initial or first stop pressure. Fig. 13, is a view showing the position of the parts illustrated in Fig. 11, when the lower plungers apply the second or lower pressure, the third or repeated top pressure being shown in Fig. 3. Fig. 14, is a view of the same parts illustrated in Fig. 11, showing their position while the lower plungers are moving to the level of the top surface of the mold table, and Fig. 15, is a view of the same parts shown in Fig. 11, when the top surfaces of the lower plungers have attained the same level as the top surface of the mold table. Fig. 16, is a perspective view showing a modification of the construction illustrated in Fig. 10.

Like characters of reference refer to like parts throughout the specification and drawings.

At the front of the inner surface of the main frame sides $a$ are slideways $b$, and vertically movable in the slideways $b$ are side bars $c$. Mounted in the side bars $c$, near their top ends, is the upper toggle shaft $d$ on which is mounted the hub $e$ of the upper toggle bar $f$. Rigidly fastened to the lower end of the side bars $c$ is the lower cross head $g$. Journaled in the lower ends of the upper toggle bars $f$ is the knuckle shaft $h$ and articulatingly mounted on the knuckle shaft $h$ are the upper ends of the lower toggle bars $i$. Mounted in the lower ends of the lower toggle bars $i$ is the lower toggle shaft $j$ from which is suspended the upper cross head $k$, and adjustably connected to the upper cross head $k$ by clamps $l$ are the upper plungers $m$. The clamps $l$ permit of the lateral adjustment of the upper plungers $m$, and by doing so provide for the change of the size and number of the plungers employed.

Removably connected to the compression faces of the upper plungers $m$ are the plunger plates $o$. The plunger plates $o$ are detachably connected to the upper plunger $m$ by cap-screws $p$ so that the plates may be removed and changed to compensate for the wear upon them or to accord with any change in the size or appearance of the molded material. The upper toggle bar $f$ is preferably made in two separable parts 1 and 2 connected together by cap-screws or studs 3 to permit of the insertion of the shims $q$ between them. By making the upper toggle bar of two separable parts and employing the shims, it is possible to quickly adjust the machine to compensate for the wear upon the parts so that the manufactured product will be of a uniform thickness, and when it is desired to vary the thickness of the manufactured product the shims can be introduced between the separable parts or removed from between them for that purpose. Both the upper and lower toggle bars $f$ and $i$ can be each made of two separable parts in the same manner as the upper toggle bar $f$, or instead of making the upper toggle bar $f$ of two separable parts the lower toggle bar $i$ can be made in that way to perform the same functions as above described, in connection with the upper toggle bar. The lower plungers $r$, are connected by clamps $s$ to the lower cross head $g$. The clamps $s$ permit of the lateral adjustment of the lower plungers $r$ on the lower cross head to provide for the change of the number and size of the lower plungers to correspond with the same changes in the upper ones.

Removably connected to the lower plungers $r$ by cap-screws $t$, are the lower plunger plates $u$. In the upper and lower plungers $m$ and $r$ are steam chambers $v$ close to the compression faces and extending nearly the full width of the plungers, and leading from the steam chambers $v$ to the opposite faces of the plungers are steamways $w$ having their outer ends closed by removable plugs $x$. By making the plungers separable from the cross heads and forming the steam chambers and steamways as above described, it is possible to positively remove the cores in every instance and by providing the steamways with removable plugs it is possible to clean the steam chambers when the plungers are removed from the cross heads.

Mounted on the knuckle shaft $h$ is the knuckle hub $y$ of the link $z$. The link $z$ is provided with a journal box $a'$ mounted on the crank $b'$ of the main shaft $c'$. The main shaft $c'$ is journaled in the main frame sides $a$ and is rotated by the spur wheel $d'$ driven by a suitable intermeshing gear. During the revolution of the main shaft $c'$ the crank $b'$, through the agency of the link $z$, changes the position of the toggle by moving it between the places of its least and greatest flexion. Mounted on the main shaft $c'$ are the cams $e'$ which engage with the rollers $f'$ of the lifting levers $g'$. The lifting levers $g'$ are fulcrumed upon a shaft or upon studs $h'$ supported by the main frame sides $a$ and knuckled to the lifting levers $g'$ are the lifting arms $i'$ for the upper toggle shaft $d$. The boxes $j'$ of the lifting arms $i'$ encircle the upper toggle shaft $d$ and during the rotation of the cams $e'$ the lifting levers $g'$ operate to raise and lower the lifting arms $i'$ and upper toggle shaft $d$ and cause the upward movement of the side bars $c$ in the slideways $b$. In the boxes $j'$ are semi-bushings $k'$ for the upper toggle shaft $d$ and interposed between the semi-bushings $k'$ and the bottom of the boxes are inclined wedges $l'$ adjustable by means of set screws $m'$. The adjustment of the inclined wedges $l'$ provides for the vertical adjustment of the upper toggle shaft $d$ with respect to the top surface of the mold table $o'$. The vertical adjustment of the upper toggle shaft effects the vertical adjustment of the side bars $c$ and the lower cross head and lower plungers, and the purpose of the adjustment of these parts is to determine the position of the top surface of the lower plungers with respect to the top surface of the mold table during the delivery of the molded material from the molds $p'$. The mold table $o'$ is vertically movable between the main frame sides $a$, and its vertical movement is effected by two sets of adjusting arms $q'$. The lower ends of the adjusting arms $q'$ are articulatingly connected to the main frame and their upper ends are articulatingly and slidably connected to the mold table.

As shown in Fig. 1, of the drawings the main frame sides $a$ are provided with cup shaped blocks $r'$ below the mold table $o'$ and contained in the cup shaped blocks $r'$ are the ball shaped lower ends of the adjusting arms $q'$. The upper ends of the adjusting arms $q'$ are ball shaped and are contained in the cup shaped blocks $s'$ slidably connected to the mold table $o'$ to move laterally with the upper ends of the adjusting arms $q'$ as the latter move between their upright and inclined positions. The adjusting arms $q'$ are actuated by adjusting bolts $t'$ extending through the main frame sides $a$ and the adjusting bolts $t'$ are provided on the outer faces of the main frame sides $a$ with adjusting nuts $u'$ shown in dotted lines. The adjusting arms $q'$ are vertically slotted to permit of the adjusting bolts $t'$ retaining their correct position while actuating the adjusting arms.

The actuation of the adjusting bolts $t'$ to bring the adjusting arms to a vertical position, raises the mold table and the actuation of the adjusting bolts to bring the adjusting arms to an inclined position lowers the elevation of the mold table. The nearer the adjusting arms approximate a vertical position, the higher is the elevation of the mold table and the nearer the adjusting arms approximate a horizontal position the lower is the elevation of the mold table.

The adjusting arms can be mounted on pivot bolts connected to the supporting box as shown in Fig. 16 instead of employing the ball and cup connection for them, and the same purpose can be attained as with the cup and ball formation. Within the mold table $o'$ is a mold chamber $v'$ alined with the upper and lower cross heads and contained in the mold chamber $v'$ are the mold side walls $w'$ dividing the mold chamber into a group of molds $p'$ alined with the upper and lower plungers and contained between the mold side walls $w'$ are the mold end walls $x'$. Engaging the outer surfaces of the side walls $w'$ of the end molds are the adjusting blocks $y'$ actuated by the eccentric bolts $z'$. The eccentric bolts $z'$ extend beyond the mold table $o'$ and are screw threaded to provide for the adjustment of the lock nuts $a''$ which are employed to clamp the parts of the mold table and molds together. The eccentric bolts $z'$ beyond the lock nuts $a''$ are formed with facets $b''$ to receive a tool by which the eccentric bolts can be turned to move the adjusting blocks $y'$ forcibly into contact with the outer surfaces of the mold side walls $w'$ of the end molds and clamp the mold side walls tightly against the mold end walls $x'$. Extending through the mold table $o'$ are adjusting screws $c''$ to effect the adjustment of the mold end walls $x'$. The adjustment of the mold end walls $x'$ through the agency of the adjusting screws $c''$ compensates for the wear on their working faces and permits of the length of the molds being varied to produce molded material of any selected size within the range of the greatest dimensions of the molds $p'$.

During the revolution of the main shaft $c'$ the cams $e'$ engage with the rollers of the lifting levers $g'$. When that part of the cams $e'$ marked 4 (see Fig. 8,) engages with the rollers of the lifting levers the upper and lower plungers are in the position shown in Fig. 11, that is the lower plungers are at their lowest elevation and the toggle is at its greatest flexion and the upper plungers are raised sufficiently above the mold table to permit of the feed box being directly over the molds so that the material can drop directly from the feed box into the molds.

When the cams $e'$ between the points marked 4 and 5 are engaging the rollers of the lifting levers the lower plungers are stationary, and the feed box $d''$ is returned to its initial position beneath the hopper $e''$ through the agency of the feed rod $f''$ and feed arms $g''$ actuated by the feed box cam $h''$ revolving with the main shaft.

When the feed box has returned to its initial position the toggle through the agency of the link $z$ actuated by the main shaft crank completes its movement to the place of its greatest flexion and commences its return to the place of its least flexion to bring the upper plungers into the mold to apply the initial or first top pressure of the upper plungers to the material as shown in Fig. 12, which is completed when the cams $e'$, at the place marked 5, engage with the lifting lever rollers. When the cams $e'$ are moving from the place marked 5 to that marked 6 they are actuating the lifting levers to raise the lifting arms, the upper toggle shaft, side bars, lower cross head, and lower plungers into the position shown in Fig. 3 to cause the lower plungers to apply the second, or lower, pressure to the material, the upper plungers moving upwardly with the upper toggle shaft coincident with the upward movement of the lower plungers. The pressure of the upper plungers on the material is however not relieved for the reason that the link $z$ actuated by the main shaft crank is continuing to bring the toggle to its place of least flexion which is attained when the cams $e'$ at the point marked 6 engage with the rollers of the lifting levers, the position of the upper and lower plungers being clearly shown in Fig. 3. When the cams between the points marked 6 and 7 are engaging the lifting lever rollers the link $z$ moves the toggle, and the upper plungers into the position shown in Fig. 13 and brings them back again into the position shown in Fig. 3 to repeat the top pressure as the point marked 7 engages the rollers of the lifting levers.

When the cams engage the lifting lever rollers between the points marked 7 and 8, the plungers move upward into the position shown in Fig. 14 and attain that position when the point marked 8 engages the lifting lever rollers. When the cams between the points marked 8 and 9 engage the lifting lever rollers, the upper and lower plungers remain in the position shown in Fig. 15 and the feed box cam $h''$ moves the feed box $d''$ across the mold table to deliver the molded material from the lower plungers, the feed box $d''$ then placing its contents in position to drop into the molds when the lower plungers quickly return to the position shown in Fig. 11, the return of the lower plungers to this last named position being effected when the cams between the points marked 9 and 4 are engaging with the lifting lever rollers.

Having thus fully described our invention what we claim as new and desire to secure by Letters Patent is:—

1. A press comprising a set of plungers, a shaft from which the plungers are suspended, operable means actuating the plungers, side bars suspended from the shaft, a second set of plungers opposed to the first mentioned set of plungers actuated by the side bars, lifting means for the shaft, and adjusting means interposed between the shaft and the lifting means consisting of two members the engaging faces of which are inclined in opposite directions and movable across each other.

2. A press comprising a toggle shaft, a toggle suspended from the toggle shaft, a set of plungers carried by the toggle, operable means actuating the toggle, side bars suspended from the toggle shaft, a set of plungers actuated by the side bars, operable lifting means for the toggle shaft, and adjusting wedges interposed between the lifting means and the toggle shaft.

3. A press comprising a set of plungers, a shaft from which the plungers are suspended, operable means actuating the plungers, side bars suspended from the shaft, a second set of plungers opposed to the first mentioned set of plungers raised and lowered by the side bars, operable lifting arms embracing the shaft and adjusting wedges interposed between the shaft and the lifting arms.

4. A press comprising a set of plungers, a shaft from which the plungers are suspended, operable means actuating the plungers, side bars suspended from the shaft, a second set of plungers actuated by the side bars, a lifting means embracing the shaft, and adjusting wedges interposed between the shaft and the lifting means.

5. A press comprising a toggle shaft, a toggle suspended from the toggle shaft, a set of plungers carried by the toggle, operable means actuating the toggle, side bars suspended from the toggle shaft, a set of plungers actuated by the side bars, lifting means embracing the toggle shaft, and adjusting wedges interposed between the lifting means and the toggle shaft.

6. A press comprising a set of plungers, a shaft from which the plungers are suspended, operable means actuating the plungers, side bars suspended from the shaft, a second set of plungers opposed to the first mentioned set of plungers, raised and lowered by the side bars, operable lifting arms, boxes for the lifting arms embracing the shaft and adjusting wedges interposed between the shaft and the boxes.

7. A press comprising a toggle shaft, a toggle suspended from the toggle shaft, a set of plungers carried by the toggle, operable means actuating the toggle, side bars suspended from the toggle shaft, a set of plungers actuated by the side bars, fulcrumed lifting levers, lifting arms knuckled to the lifting levers, boxes for the lifting arms embracing the toggle shaft, bushings within the boxes of the lifting arms, and adjustable wedges interposed between the bushings and the boxes for adjusting the toggle shaft.

8. A press comprising a main frame, a vertically movable mold table, and means for varying the elevation of the mold table, said means consisting of adjusting arms, the upper ends of which are articulatingly and slidably connected with the mold table, and the lower ends of which are articulatingly supported by the main frame and means between the places of articulation for actuating the adjusting arms to change their inclination.

9. A press comprising a main frame, a vertically movable mold table, vertically disposed adjusting arms, means articulatingly holding the lower ends of the adjusting arms, the latter supporting at their upper ends the mold table, and means actuating the adjusting arms by which they can be moved between a vertical, and an inclined, position.

10. A press comprising a main frame, a vertically movable mold table, adjusting arms, means articulatingly supporting the lower ends of the adjusting arms, a slidable means for the mold table with which the upper ends of the adjusting arms articulatingly engage and means causing the movement of the adjusting arms to vary the elevation of the mold table.

11. A press comprising a main frame, a vertically movable mold table, adjusting arms, means forming part of the main frame articulatingly holding the lower ends of the adjusting arms, means forming part of the mold table articulatingly holding the upper ends of the adjusting arms and an actuating means engaging the adjusting arms between their places of articulation.

12. A press comprising a main frame, a vertically movable mold table, sockets for the main frame, sockets for the mold table, adjusting arms having rounded ends contained in the sockets of the main frame and the mold table, and an actuating means for the adjusting arms.

13. A press comprising a main frame, a vertically movable mold table, stationary sockets forming part of the main frame, slidable sockets for the mold table, adjusting arms having rounded ends contained in the sockets of the main frame and the mold table, and adjusting means for positioning the adjusting arms.

14. A press comprising a main frame, a vertically movable mold table, adjusting arms articulatingly supported at one end by the main frame, and articulatingly and slidably connected at the other end with the vertically movable mold table and adjusting bolts connected to the adjusting arms between their places of articulation.

15. A press comprising a main frame, a vertically movable mold table, adjusting arms supported at their lower ends from the main frame, means slidably connected to the mold table with which the upper ends of the adjusting arms articulatingly engage, and adjusting bolts connected to the adjusting arms between their ends.

16. A press comprising a main frame, a vertically movable mold table, sockets connected to the main frame, sockets slidably connected to the mold table, adjusting arms having rounded ends contained in the sockets of the main frame and the mold table, and adjusting bolts for varying the inclination of the adjusting arms.

17. A press comprising a mold table having an aperture therein, transverse partitions, contained in and movable lengthwise of the aperture, forming the mold side walls, movable spacing members forming the mold end walls, contained between the mold side walls, adjusting blocks engaging the mold side walls at the ends of the aperture, eccentric bolts engaging the adjusting blocks, and adjusting screws for engaging the mold end walls and adjusting them between the mold side walls.

18. A press comprising a set of vertically movable plungers, operable means actuating the plungers, a second set of vertically movable plungers, operable lifting means for raising and lowering the two sets of plungers and a cam having a cam surface actuating the lifting means to hold the second mentioned set of plungers stationary in their initial position during the filling of the molds, and when the first mentioned set of plungers are applying the initial pressure, a cam surface forming a continuation of the first mentioned cam surface actuating the lifting means to raise the second mentioned set of plungers to apply their initial pressure and to hold them in that position while the first mentioned set of plungers repeat their pressure, a cam surface forming a continuation of the second mentioned cam surface actuating the lifting means to effect the upward movement of the second mentioned plungers to bring the molded material to the delivery position, and a cam surface restoring the lifting means and the second mentioned set of plungers to their initial positions.

19. A press comprising upper and lower cross heads, plungers removably and adjustably connected to the upper and lower cross heads, having steam chambers close to their compression faces and extending nearly across the full width thereof and having steam-ways leading from the steam chambers to the faces of the plungers opposite the compression faces, plugs to close the outer ends of the steam-ways, and operable means actuating the cross head and plungers.

Toronto, April 27th A. D. 1908.

ANTON BERG.
    JOHN BERG.

Signed in the presence of—
 C. H. RICHES,
  OLIVE BATEMAN.